UNITED STATES PATENT OFFICE.

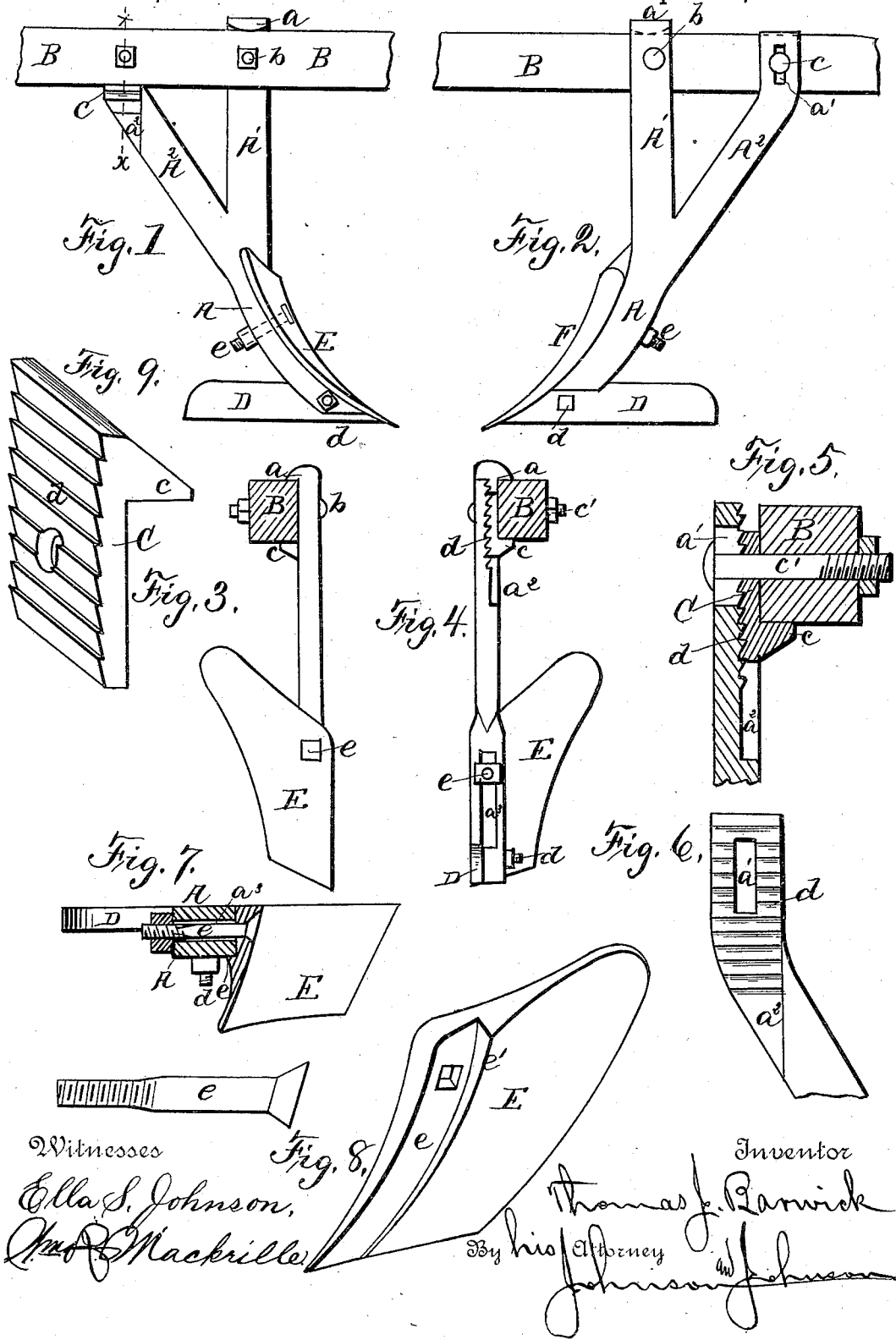

THOMAS J. BARWICK, OF NEAR THOMASVILLE, GEORGIA.

SHOVEL-PLOW.

SPECIFICATION forming part of Letters Patent No. 369,905, dated September 13, 1887.

Application filed March 11, 1887. Serial No. 230,529. (No model.)

*To all whom it may concern:*

Be it known that I, THOMAS J. BARWICK, a citizen of the United States, residing near Thomasville, in the county of Thomas and State of Georgia, have invented a new and useful Improvement in Shovel-Plows, of which the following is a specification.

The improvement which I have made relates to the class of plows known as "shovel-plows," in which the shoe or shovel is secured and made adjustable, as it wears away, by a single bolt passing through a slot in the foot of the standard. Hitherto in such plows the inner wall of the share has been made unbroken and bound by the bolt upon the curved edge of the standard, and is therefore liable to be twisted upon its seat or be turned out of its true position upon its single fastening-bolt as a pivot.

The object of my improvement is to prevent the turning of the share upon its seat and upon its single fastening-bolt of a slotted standard. This I do by recessing the mold-board on its inner wall at the landside edge so as to form a shoulder, which extends from the top edge to the bottom edge of the share, the bottom of said recess beveling or inclining inward from its landside edge, whereby the share is caused to stand in an inclined relation to the front face of the slotted standard, against the inner or furrow side of which the standard rests, and thereby removes all lateral strain upon the single bolt and holds the mold-board in place upon the standard, and forms a guide in setting the share down as it wears away at its cutting-edge. I know that in plows of this kind the share at its landside edge has been formed with a lip, which laps over the landside of the standard, and that the share has been secured by two bolts upon a side extension of the standard to prevent it from turning upon the standard; but these plans are more expensive and do not afford the facility for adjustment which my improvement does.

In the drawings, Figure 1 shows the mold-board side of the plow. Fig. 2 shows the landside thereof. Fig. 3 shows the same in front view, and Fig. 4 in rear view. Fig. 5 shows a vertical cross-section of the rear standard branch on line $x$ of Fig. 1. Fig. 6 shows the toothed side of the rear standard. Fig. 7 is a horizontal section through the mold-board and standard. Fig. 8 shows the recessed shouldered wall of the mold-board, and Fig. 9 shows the toothed lipped plate of the rear standard.

The plow-standard A is bifurcated and forms two bearings, $A'$ $A^2$, the front one of which stands vertically, and the other stands rearwardly and forms a brace or stay for the standard. The beam B rests against the side of the standard and its branch, and is pivotally connected with its front branch by the bolt $b$, which forms a fulcrum for the beam in adjusting it in connection with the adjusting device to regulate the pitch of the plow-point for plowing shallow or deep.

The shovel or share E is adjustably secured to the standard by a square shank-bolt, $e'$, passing through a vertical slot, $a^2$, therein, below the branch standard. A recess, $e'$, is formed upon the inner wall of the shovel extending from the landside edge with an inward bevel or inclination, so as to form a shoulder or ridge, $e^2$, which extends from the top edge to the bottom edge of the shovel to receive and form a solid support upon the plow-standard for the shovel, so that the latter can be firmly secured by a single bolt, which is relieved from all lateral strain, and upon which the shovel is prevented from turning. The beveling of the recess bottom gives the shovel an inclined relation backward from the standard, which gives an easier movement in the furrow and turns the soil better. In setting the shovel down as it wears away at its cutting-edge, the bolt is loosened and the shovel is held in true position by the recess and shoulders while setting it down, so that it can be at once secured without trouble. The landside edge of the shovel is thickened for the purpose of permitting the formation of the beveled seat and the shoulder, as stated.

The head of the bolt is beveled and square, and is inclined with the outer wall of the share, as shown.

I claim—

The shovel or share formed with the recess $e$ on its wall, extending from its landside edge and terminating in a shoulder, $e'$, extending from the top edge to the bottom edge, in combination with the standard having the vertical slot $a^3$ and the fastening-bolt $e$, as shown and described.

In testimony whereof I have hereunto set my hand in the presence of two subscribing witnesses.

THOMAS J. BARWICK.

Witnesses:
N. E. CHASTAIN,
G. M. MCMILLAN.